United States Patent
Smathers et al.

(10) Patent No.: US 7,350,070 B2
(45) Date of Patent: Mar. 25, 2008

(54) METHOD AND SYSTEM FOR CRYPTOGRAPHICALLY SECURE HASHED END MARKER OF STREAMING DATA

(75) Inventors: Kevin L Smathers, Hayward, CA (US); Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 767 days.

(21) Appl. No.: 10/823,837

(22) Filed: Apr. 12, 2004

(65) Prior Publication Data
US 2005/0226419 A1    Oct. 13, 2005

(51) Int. Cl.
*G06F 1/24* (2006.01)
(52) U.S. Cl. ............... 713/150; 713/153; 713/161; 713/168
(58) Field of Classification Search ........... 713/150, 713/153, 161, 168
See application file for complete search history.

(56) References Cited

U.S. PATENT DOCUMENTS

| | | | |
|---|---|---|---|
| 5,313,521 | A | 5/1994 | Torii et al. |
| 6,189,098 | B1 | 2/2001 | Kaliski, Jr. |
| 6,356,937 | B1 | 3/2002 | Montville et al. |
| 6,367,009 | B1 | 4/2002 | Davis et al. |
| 6,401,203 | B1 | 6/2002 | Eigeles |
| 6,411,715 | B1 | 6/2002 | Liskov et al. |

*Primary Examiner*—Thomas R. Peeso

(57) ABSTRACT

A method and system for cryptographically secure hashed end marker of streaming data. In one embodiment, a method for transmitting streaming data comprises establishing a shared secret between a receiving participant and a sending participant; using the shared secret to initialize a cryptographically secure hashed end of file marker for the streaming data that is updated as the streaming data is transmitted or received; transmitting the streaming data from the sending participant to the receiving participant; and comparing the streaming data with the cryptographically secure hashed end of file marker to determine when an end of the streaming data occurs.

20 Claims, 2 Drawing Sheets

METHOD AND SYSTEM FOR CRYPTOGRAPHICALLY SECURE HASHED END MARKER OF STREAMING DATA

BACKGROUND

Streaming data includes media and multimedia files, such as video clips and audio, that begin playing as they are received. The media is delivered in a "stream" from the server to the user. Streaming video, for example, is a sequence of moving images that are sent in compressed form over the Internet and displayed as they arrive. As another example, streaming media is streaming video with sound.

The use of streaming media is growing in popularity. Users of the internet, for example, can view videos or listen to music without waiting for large data files to download to the computer. For video and audio files, for instance, the user needs a video/audio player to uncompress the data and send it to a display or speakers.

Unfortunately, streaming media is susceptible to unwanted, malicious, and surreptitious attacks, especially since users cannot verify that an end of streaming media has been received. A malicious third party could use a known or predictable end of stream marker to change the software of the user from streaming mode to command mode. Once in command mode, the malicious third party could obtain the trust and privileges of the streaming media server.

In other instances, some viruses can attach themselves to various locations of program files and replace code, fill in open spaces in the code, or create companion files to work with an executable file. Parasitic type viruses, for example, can attach themselves to the beginning or end of a file. When the virus attaches to the end of the file, the virus also changes the beginning so that the viral code is launched first. A worm, for example, may be able to attach itself to the end of the data stream while the stream is being downloaded. The worm installs itself to the computer system and then runs a spreading routine and payload. Worms can even be designed to copy themselves and penetrate other users on a network.

SUMMARY

Embodiments in accordance with the present invention are directed to a method and system for creating a cryptographically secure hashed end marker of streaming data. In one embodiment, a method for transmitting streaming data comprises establishing a shared secret between a receiving participant and a sending participant; using the shared secret to initialize a cryptographically secure hashed end of file marker for the streaming data that is updated as the streaming data is transmitted or received; transmitting the streaming data from the sending participant to the receiving participant; and comparing the streaming data with the cryptographically secure hashed end of file marker to determine when an end of the streaming data occurs.

Other embodiments and variations of these embodiments are shown and taught in the accompanying drawings and detailed description.

DETAILED DESCRIPTION

Figure 1:
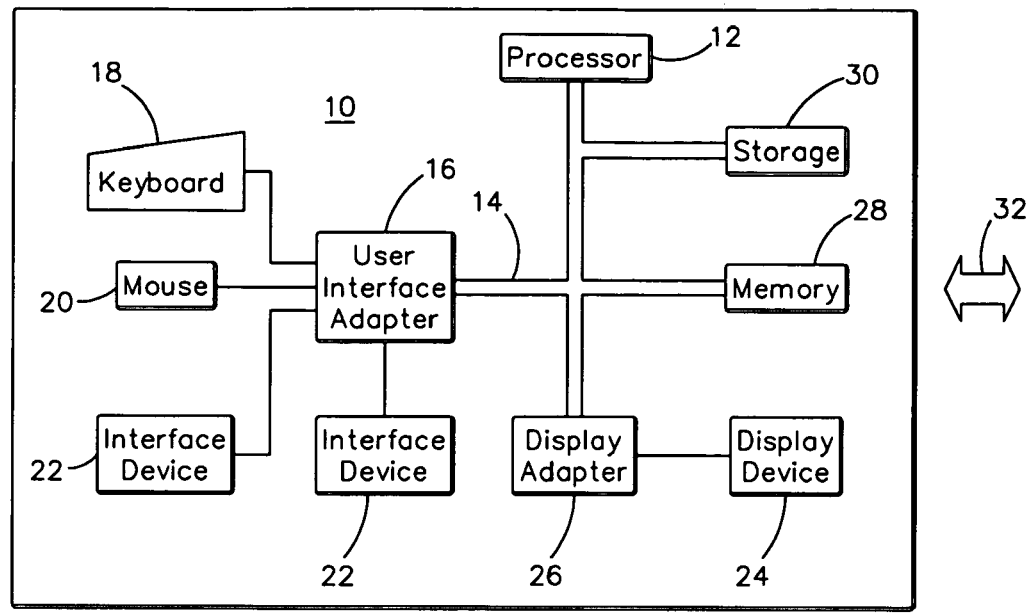
FIG. 1 is a block diagram of a computer in accordance with the present invention.

FIG. 1 illustrates a representative computer hardware environment in which an embodiment in accordance with the present invention may be practiced. The environment of FIG. 1 comprises a representative single user computer 10, such as a personal computer, including related peripheral devices. The computer 10 includes a microprocessor 12 and a bus 14 used to connect and enable communication between the microprocessor 12 and the components of the computer 10. The computer 10 typically includes a user interface adapter 16 that connects the microprocessor 12 via the bus 14 to one or more interface devices, such as a keyboard 18, mouse 20, and/or other interface devices 22. The interface adapter 16 can be any user interface device, such as a touch sensitive screen, digitized entry pad, or any one of other embodiments. The bus 14 also connects a display device 24, such as an LCD screen or monitor, to the microprocessor 12 via a display adapter 26. The bus 14 also connects the microprocessor 12 to memory 28 and long-term storage 30 that can include a hard drive, diskette drive, tape drive, etc.

The computer 10 may communicate with other computers or networks of computers, for example, via a communications channel or modem 32. Alternatively, the computer 10 may communicate using a wireless interface at 32. The computer 10 may be associated with such other computers in a local area network (LAN) or a wide area network (WAN), or the computer 10 can be a client in a client/server arrangement with another computer, etc. All of these configurations, as well as the appropriate communications hardware and software, are known in the art.

For convenience of illustration, a single user computer 10 is illustrated. Embodiments in accordance with the present invention are not limited to the computer 10 of FIG. 1. Various portable and non-portable computers and/or electronic devices also may be utilized. By way of example, embodiments in accordance with the present invention include, but are not limited to, computers (portable and non-portable), laptops, notebooks, personal digital assistants (PDAs), tablet PCs, handheld and palm top electronic devices, compact disc players, portable digital video disk players, radios, cellular communication devices (such as cellular telephones), televisions, and other electronic devices and systems whether such devices and systems are portable or non-portable.

Figure 2:
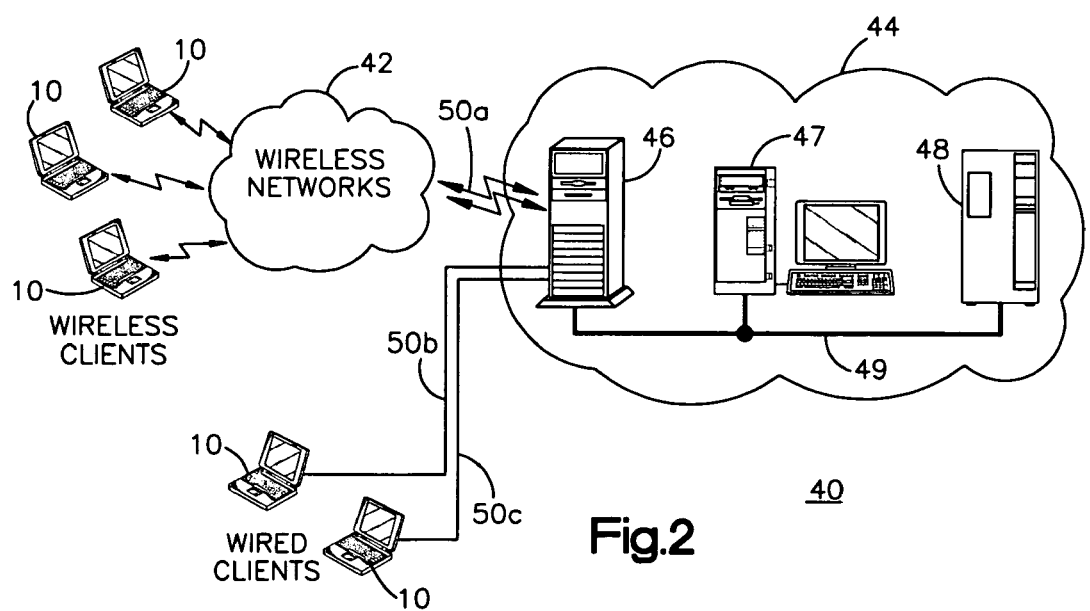
FIG. 2 is a diagram of a networked environment in accordance with the present invention.

FIG. 2 illustrates a system or data processing network 40 in which an embodiment in accordance with the present invention may be practiced. The data processing network 40 may include a plurality of individual networks, such as wireless network 42 and network 44, each of which may include a plurality of individual computers 10. Additionally, as those skilled in the art will appreciate, one or more LANs may be included (not shown), where a LAN may comprise a plurality of intelligent computers coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly or indirectly coupled to one or more computers 10 using, for example, a communications link 50*b*, 50*c*. A storage device or data repository 48 is coupled via 49 to gateway 46 and server 47.

Those skilled in the art will appreciate that the gateway computer 46 may be located a great geographic distance from the network 42, and similarly, the computers 10 may be located a substantial distance from the networks 42 and 44. Further, the computers 10 can connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 can connect to the gateway 46 using various network connections 50*a*, such as TCP or UDP (User Datagram Protocol) over IP, Frame Relay, ISDN (Integrated Services Digital Network), PSTN (Public Switched Telephone Network), just to name a few examples. The computers 10 may alternatively connect directly to the gateway 46 using dial connections 50*b* or 50*c*. Further, the wireless network 42 and network 44 may connect to one or more other networks (not shown) in an analogous manner to that depicted in FIG. 2.

A user of the present invention at a client computer may connect his computer to a server using a wireline connection or a wireless connection. Wireline connections are those that use physical media such as cables and telephone lines, whereas wireless connections use media such as satellite links, radio frequency waves, and infrared waves, for example. Many connection techniques can be used with these various media, such as using modems, cable connections, telephone lines, DSL, satellite, LAN cards, and cellular modems, just to name a few examples.

The networks 42 and 44 can have various embodiments and still be within embodiments in accordance with the present invention. Similarly, a gateway or server can be one of any number of different types of computers that have processing and communication capabilities. Various alternatives for connecting servers, computers, and networks will not be described as such alternatives are known in the art.

Embodiments in accordance with the present invention can be implemented in a variety of networks, and such networks are not limited to computing networks (such as the network discussed in connection with FIG. 2). For example, other types of digital communication networks are also applicable. Such networks include, but are not limited to, a digital telephony network, a digital television network, or a digital cable network, to name a few examples.

In the various embodiments in accordance with the present invention, embodiments are implemented as one or more computer software programs. The software may be implemented as one or more modules (also referred to as code subroutines, or "objects" in object-oriented programming). The location of the software (whether on the client computer or elsewhere) will differ for the various alternative embodiments. The software programming code, for example, can be accessed by the microprocessor 12 of the computer 10 and server 47 from long-term storage media of some type, such as a CD-ROM drive or hard drive. The software programming code may be embodied or stored on any of a variety of known media for use with a data processing system or in any memory device such as semiconductor, magnetic and optical devices, including a disk, hard drive, CD-ROM, ROM, etc. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

Embodiments in accordance with the present invention are generally directed to cryptographically securing hashed end markers of streaming data. Only the intended participants can recognized and/or verify the logical end of the streaming data. As such, a third party (i.e., a non-intended participant) is unable to insert a false logical end of data in the streaming data since this third party would not be able to construct a valid logical end of data without being privy (or an intended party) to the secret between the participants. Thus, even if the third party has visibility of the streaming data transmission, the third party would not be able to escape the client from the streaming data, and thus obtain the trust level of the network server. For example, a malicious third party could not use a known or predictable end of stream marker to change the software of the user from streaming mode to command mode.

A wide range of implementations exists for the embodiments in accordance with the present invention. For example, in one embodiment, participants (such as a computers, servers, users, etc.) share a secret. The logical end of data within streaming data of unknown length is then calculated using a hashing algorithm that is calculated from the shared secret between the participants. As the data is streamed between the participants, only the validated/authenticated participants can recognize and/or verify the logical end of data in the data stream. Recognition and/or verification of the logical end of data is limited to the participants since the end of data (such as the end of data marker) is cryptographically secured with the hashing algorithm, and only the participants can recognized and/or verify the actual end of data.

When the hashed end of data is recognized and/or verified, the receiving participant knows the intended, actual, or real location of the end of the streaming data. The participant can then recognize and block and/or discard unwanted or additional data attached to or sent after the end of the streaming data. For example, if a virus (or other unwanted or undesirable code) attaches or occurs after the logical end of data in the data stream, the participant can recognize that such additional code is not part of the original intended steaming data since the code occurred after the logical end. A participant can thus recognize unwanted or unintended additional data or code occurring after the logical end of the streaming data. For example, if data is inserted into the middle of the stream, the participant will not receive a valid end of stream data and will know that the stream has been tampered with or altered.

Figure 3:
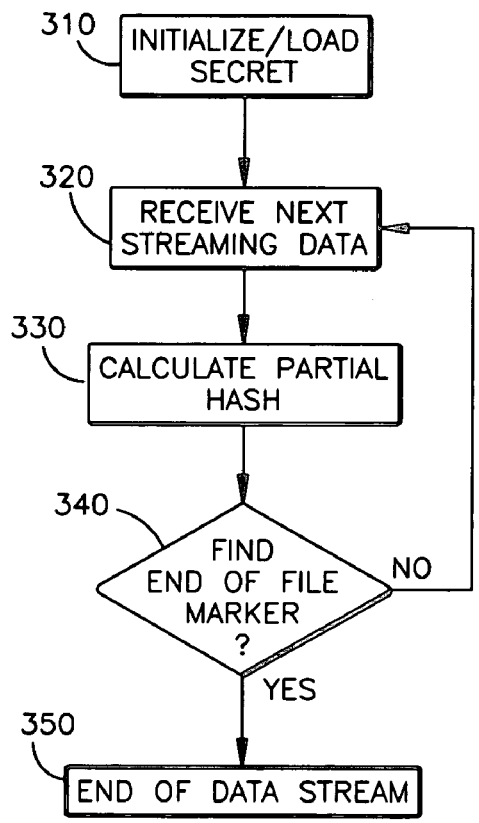
FIG. 3 is a flow diagram in accordance with the present invention.
Figure 4:
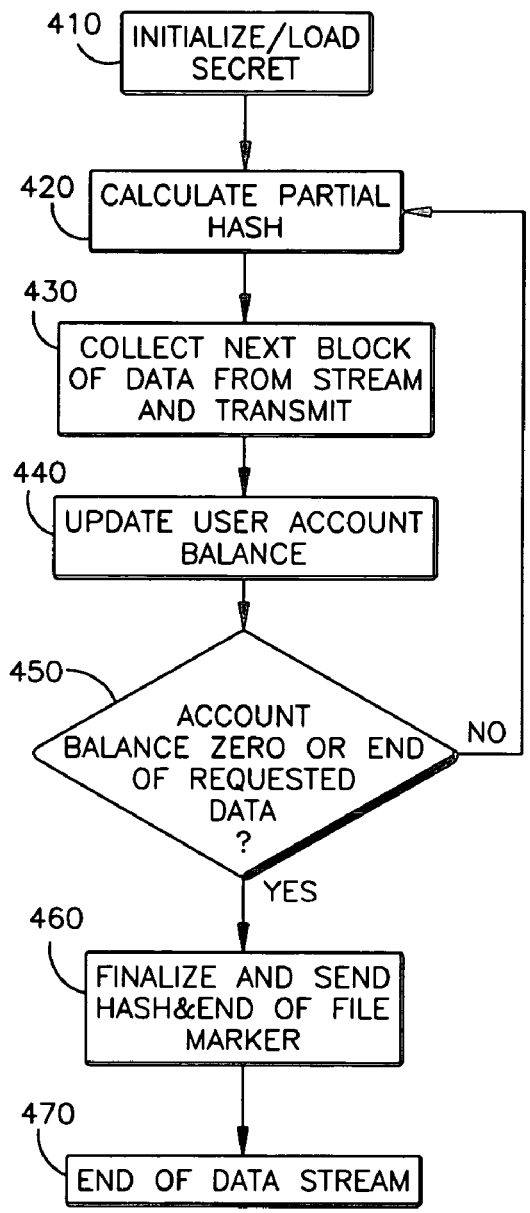
FIG. 4 is a flow diagram in accordance with the present invention.

FIGS. 3 and 4 show flow diagrams in accordance with embodiments of the present invention. For convenience of illustration and discussion, the flow diagrams are divided into two illustrations. FIG. 3 shows a receiving side participant (such as a user), and FIG. 4 shows a sending side participant (such as a server). The receiving participant in the receiving side, for example, could be computer 10 of FIG. 2, and the sending participant in the sending side could be server 47 of FIG. 2. The division of these diagrams and designations as receiving side or receiving participant, sending side or sending participant, user, and server are not meant to limit alternate embodiments in accordance with the present invention. Numerous alternatives are within the scope of embodiments in accordance with the present invention. As further examples (with no intention to limit the invention), both participants could be computer 10 (i.e., both the receiving and sending sides could be a computer 10 shown in FIG. 1 or FIG. 2). Alternatively, both participants could be servers, computers, or other electronic devices communicating within, between, or among one or more networks. Further yet, the participants could utilize any of the various networks discussed herein.

Looking first to FIG. 3, a flow diagram for the receiving participant (for example, a user) is shown. Block 310 shows initialize and/or load secret. Here, for example, the participants can utilize a stored password or a pre-arranged secret. In general, any shared secret will suffice, and numerous methods, systems, and apparatus exist for establishing such a shared secret between two participants. Embodiments in accordance with the present invention are not limited to any particular shared secret or any particular method, system, or apparatus for establishing a shared secret between two participants. Several examples of shared secrets are discussed below.

Further, communication between the participants can occur over the Internet, an intranet, a network, or the like without the participants being able to see each other or otherwise determine with whom they are communicating. Authentication, for example, is a technique that helps to ensure that the participants are who they represent themselves to be, regardless of whether the participants are human users or application programs. Authentication, for example, can occur with a username (i.e., a name used to gain access to a computer or computer system) and password (i.e., a secret series of characters).

Authentication may or may not include authorization of the participant(s). Authorization is the process of giving participants access to system objects based on their identity. In other words, a computer security system can be based on two different processes or stages. The first stage is authentication, which ensures that a participant is who he or she claims to be. The second stage is authorization, which allows the participant to access various resources based on the participant's identity.

As another example of a shared secret, a cryptographic key exchange occurs between the participants. Such a cryptographic key exchange is discussed to illustrate an exemplary method for establishing a shared secret, but this key exchange should not be construed to limit the invention. Cryptographic keys may include both or either symmetric and asymmetric keys. Symmetric keys are generally kept only within a restricted group of users, because if a message is encrypted with a symmetric key K1 then anyone knowing K1 can decrypt that message. By contrast, in asymmetric keys, at least one pair of keys is associated with each owner. One key of each pair of keys is private (known and kept only by its owner). The other key is public (i.e., the key is freely distributed to the public). A message encrypted with one of the keys of the pair can be decrypted only with the other key in the pair. In addition, a message may be cryptographically signed with one of the keys in the pair and the second key in the pair may then be used to verify the authenticity of the specific message.

As used herein, the terms "owner" and "user" and "participant" are not restricted to humans but may equally encompass machines or programs, or, for that matter, multiple tasks and devices.

Various cryptographic key exchanges can occur that are within embodiments in accordance with the present invention. Such key exchanges, for example, can include RSA (Rivest, Shamir, and Adleman) algorithms, the Certicom ECC (elliptic curve cryptography) algorithm, Diffie-Hellman algorithms and any other cryptographic key exchange algorithm. Embodiments of the invention, though, should not be limited to any particular key exchange protocol.

Per block 320, the receiving participant begins to receive data from the streaming data. The streaming data can, for example, be sent from the sending participant to the receiving participant.

As used herein, streaming data is a technique for transferring data such that it can be processed as a steady and continuous stream. Typically with streaming data, the receiving participant can begin to process the data before the entire content has been transmitted. For example, a receiving participant could utilize a browser (for example, a graphical browser than can display graphics and text and present multimedia information, including sound and video) or a plug-in to display or audio the data before the entire file is transmitted. Sources of data widely vary and can include both live data feeds, such as live audio and video In fact, any telemetry source of data (such as SCADA packets, satellite telemetry, hospital patient monitors, etc.) could be utilized with embodiments in accordance with the present invention. Further sources of data include, but are not limited to, stored content such as pre-recorded events, or prerecorded events when the entire prerecorded source is not available, to name a few examples.

Various types of streaming data may be utilized with embodiments in accordance with the present invention. The streaming data, for example, may include multimedia data. Multimedia can include text, graphics, video, animation, and sound in an integrated way. Further, the streaming data can be sent, received, and processed in a variety of ways. For example, the streaming data can be broken down into multiple packets sizes or blocks according to the available bandwidth between the participants. After the receiving participant receives a sufficient number of packets, the receiving participant can simultaneously play one packet, decompress another packet, and download another packet.

Generally, the protocol defines the connection between a receiving participant and the sending participant and also provides a standard way for clients and servers from multiple vendors to stream multimedia content. Examples of such protocol include, but are not limited to, Real-time Transport protocol (RTP), Real-time Control Protocol (RTCP), Resource Reservation Protocol (RSVP), Real-Time Streaming Protocol (RTSP), Hypertext Transfer Protocol (HTTP), and Session Description Protocol (SDP), to name a few protocols.

Per block 330, the receiving participant calculates the partial hash for the streaming data. The end of data is calculated using the shared secret, together with the blocks of data that have been sent or received thus far. As noted, only the receiving and sending participants know a secret key or cryptographic key from the shared secret key exchange. By knowing this secret key, the participants can agree on a cryptographically secure hashed end marker for the end of the streaming data. Thus, only the participants will be able to recognize, verify, or construct the intended, actual, or real location of the end of the streaming data.

In one embodiment, the cryptographic key or secret key is combined with hash or a hash function of the end of data (such as the end of data marker) for the streaming data. A hash value, for example, can be a number generated from a string of text. The hash is generally smaller than the text itself and is generated by a formula. A hash function H, for example, can be a transformation that takes an input "m" and returns a fixed-size string, called a hash value "h" (such that h=H(m)). Alternatively the hash engine can be primed with the shared secret and the incoming data can be progressively added to the primed hash engine.

The hash value represents concisely the longer message or document from which it was computed; this value is called the message digest. Hash functions are known in the art and a variety of hash functions (now known or developed in the future) can be utilized with embodiments in accordance with the present invention. Examples of such hash functions include, but are not limited to, MD5, SHA-1 (Secure Hash Algorithm), and other known or hereafter developed hashing algorithms.

Per block 340, the receiving participant determines or verifies if the end of file marker is found. As noted, a portion of the end of streaming data (such as the end of file marker) can be protected from counterfeiting using a combination of both hash and the shared secret. As data is streamed to the receiving participant, the receiving participant looks for the cryptographically secured hashed end marker. Suppose, for example, that a SHA-1 hash function is coupled with a Diffie-Hellman type key exchange and end of file marker to produce a SHA-1:SUM. Here, SHA-1:SUM represents an example of a hashing algorithm combined with a shared secret. The receiving participant would calculate this SHA-1:SUM and look for this calculation in the streaming data. In other words, a comparison between the calculation and the streaming data is made. If the streaming data contains the SHA-1:SUM, then a match has occurred. In other words, the receiving participant has found the end of file marker in the streaming data since only the sending participant could have correctly calculated and sent the SHA-1:SUM.

The example of SHA-1:SUM should not be construed to limit embodiments in accordance with the present invention. Any hashing type algorithm (now known or developed in the future) can be primed or combined with a shared secret to produce a cryptographically secure hashed end of file marker.

If the end of file marker is not recognized, verified, or found in the received data, then the receiving participant knows that the streaming data is not finished. As such, the flow diagram proceeds back to block 320 to receive the next streaming data block and then calculates the partial hash. This loop (and corresponding partial hash calculations of block 330) continues if the answer to block 340 is "no." If, on the other hand, the end of file marker is recognized, verified, or found in the received data, then the receiving participant knows that the streaming data transmission is finished. As such, the flow diagram proceeds to block 350 to signify the end and validation and verification of the streaming data.

As noted, a malicious third party could not use a known or predictable end of stream marker to change the software of the user from streaming mode to command mode. Further, any data or code that appears after the end of file marker is not part of the intended streaming data. The receiving participant can thus discard, ignore, or block any code or data that appears after recognition of the end of the streaming data.

In one embodiment, the receiving participant does not know the length of the streaming data in advance (i.e., before receiving the end of file marker in the streaming data). Since this information is not known to the receiving participant and is not transmitted to the receiving participant, a third party (i.e., a non-intended participant) will not be able to know, predict, or determine when the end of the streaming data will occur. Further, since the end of the streaming data is cryptographically secure with the shared secret and hashing algorithm (and known or recognizable only to the receiving and sending participants), a third party will not be able to recognize when the end of file marker is sent from the sending participant to the receiving participant.

In one embodiment for example, only the logical end or end of file marker is protected from counterfeiting or malicious interference. In this embodiment, only the logical end is cryptographically secure with a combination of secret key exchange between the participants and a hashing algorithm.

Looking now to FIG. 4, a flow diagram for the sending participant is shown. Block 410 shows initialize and/or load secret. This secret exchange is shown and described in connection with block 310 of FIG. 3.

Per block 420, a calculation of the partial hash is made. This calculation is fully described in connection with block 330 of FIG. 3.

At block 430, the sending participant collects the next block of data for the streaming data and begins to transmit the streaming data. Streaming data transmission is fully described in connection with block 320 of FIG. 3.

At block 440, the sending participant updates the user's (i.e., the receiving participant's) account balance. Then, at block 450, the sending participant determines if the user's account balance is zero or if the end of the requested streaming data occurs.

Blocks 440 and 450 would occur, for example, if the sending participant tracks or records the amount of data being sent or streamed to the receiving participant. By way of example only, the receiving participant may be allotted a given amount of credits or data or time. As data is streamed from the sending participant to the receiving participant, the account of the receiving participant is updated to reflect the transmission of data. Receiving participants, for example, may be able to buy or purchase quantities of streaming data. When data is sent, the account of the receiving participant is accordingly adjusted. If the account balance of the receiving participant is zero, then the flow diagram continues to block 460. If, on the other hand, the account balance is not zero, then the flow diagram proceeds back to block 430 to transmit more streaming data.

Additionally as shown in block 450, the sending participant determines whether the end of requested data is reached. If the end of the requested data is reached, then the flow diagram continues to block 460. If, on the other hand, the end of the requested data is not reached, then the flow diagram proceeds back to block 430 to transmit more streaming data.

At block 460, the sending participant finalizes and sends the hash and end of file marker. The end of file marker is calculated from the hashing algorithm primed with the secret key. A calculation of the partial hash and end of file marker is fully described in connection with blocks 330 and 420.

Per block 460, sending of the cryptographically secure hashed end of file marker verifies and signifies termination of the streaming data, as shown in block 470.

FIGS. 3 and 4 provide flow diagrams in accordance with embodiments of the present invention. The diagrams are provided as examples and should not be construed to limit other embodiments within the scope of the invention. For example, the blocks should not be construed as steps that must proceed in a particular order. Additional blocks/steps may be added, some blocks/steps removed, or the order of the blocks/steps altered and still be within the scope of the invention.

Embodiments in accordance with the present invention enable streaming data to contain any binary data. The data is not required to be escaped, so it will not change length and, thus, can be transmitted without the necessity of buffer copying. Further, the full length of the data does not need to be known in advance so the sending participant (a server for example) does not need to hold the full data. Further, embodiments of the invention can be implemented so the end of the data is automatically detected (for example by the receiving participant) and so user is able to verify simultaneously that the end of the data, and the correctness of the streaming data transmission. Even if the data source (such as the sending participant) were to become corrupted, it would not be possible for a third party to insert a data end into the streaming data. Thus, data and protocol are separated and protected from one another without requiring a separate control channel.

Embodiments in accordance with the present invention further provide a means for encapsulating binary data within a stream. Since the data does not need to be re-encoded, buffer copying or extra memory requirements are not necessary. Further, since the end condition or marker can be calculated during transmission, the size of the streaming data can change during transmission or otherwise be unknown. Further, the sending participant can send new protocol commands to the receiving participant during transmission of the streaming data. These new protocol commands can interrupt the streaming data at any time, if so desired. Such an interruption allows a time-based packet delivery of streaming data, as opposed to a size-based packet delivery. Further, calculation and receipt of the end of file marker by the receiving participant validates that the streaming data was not corrupted during transmission.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A method for transmitting streaming data, comprising:
establishing a shared secret between a receiving participant and a sending participant;
using the shared secret to initialize a cryptographically secure hashed end of file marker for the streaming data;
transmitting the streaming data from the sending participant to the receiving participant; and
comparing the streaming data with the cryptographically secure hashed end of file marker to determine when an end of the streaming data occurs.

2. The method of claim 1 further comprising updating the cryptographically secure hashed end of file marker with contents of each block of the streaming data as the streaming data is transmitted.

3. The method of claim 2 wherein the hash function is SHA-1.

4. The method of claim 2 wherein the hash function is MD5.

5. The method of claim 1 further comprising:
calculating, by the receiving participant, the end of file marker, and
comparing, by the receiving participant, blocks of data within the streaming data with the end of file marker to determine if any data in the streaming data matches the end of file marker.

6. The method of claim S further comprising determining, by the receiving participant, that the end of the streaming data occurs when data in the streaming data matches the end of file marker.

7. The method of claim 6 further comprising determining, by the receiving participant, that the end of the streaming data does not occur as long as data in the streaming data does not match the end of file marker.

8. A computer-readable medium having computer-readable program code embodied therein for causing a computer system to perform:
exchanging a public key between two participants to generate a secret key;
initializing, with the secret key, a cryptographically secure end of file for streaming data;
streaming data between the two participants; and
transmitting the cryptographically secure end of file to signify between the participants an end to the streaming data.

9. The computer-readable medium of claim 8 for causing the computer system to further perform blocking, by at least one of the participants, data occurring after receipt of the cryptographically secure end of tile.

10. The computer-readable medium of claim 8 for causing the computer system to further perform streaming data from a sending participant to a receiving participant with the receiving participant not knowing a length of the streaming data while streaming data between the two participants occurs.

11. The computer-readable medium of claim 8 wherein only the two participants can recognize the cryptographically secure end of file for the streaming data.

12. The computer-readable medium of claim 11 wherein the two participants include a sending participant that sends the streaming data and a receiving participant that receives the streaming data.

13. The computer-readable medium of claim 8 wherein initializing, with the secret key, the cryptographically secure end of file for streaming data further comprises combing a hash function with the secret key.

14. A system for transmitting streaming data, comprising:
a network;
a first participant in communication with the network; and
a second participant in communication with the network, wherein the first and second participants communicate via the network to calculate a cryptographically secure end of file marker for the streaming data such that only the first and second participants can recognize the cryptographically secure end of file marker for the streaming data and such that cryptographically secure end of file marker is updated as the streaming data is transmitted or received.

15. The system of claim 14 wherein the receiving participant calculates the cryptographically secure end of file marker using both an asymmetric key exchange and a hash function.

16. The system of claim 15 wherein the asymmetric key exchange is Diffie-Hellmann and the hash function is SHA-1.

17. The system of claim 14 wherein the first and second participants communicate via the network to authenticate themselves so the participants are who they claim to be.

18. The system of claim 14 wherein only the end of file marker is cryptographically secured in the streaming data.

19. The system of claim 14 wherein the second participant automatically detects the cryptographically secure end of file marker, and the detection of the end of file marker, by the second participant, validates that the streaming data is not corrupted.

20. The system of claim 14 wherein the cryptographically secure end of file marker is calculated during transmission of the streaming data from the first participant to the second participant, and wherein the second participant automatically stops receiving data when the second participant determines that the cryptographically secure end of file marker is located in the streaming data.

* * * * *

UNITED STATES PATENT AND TRADEMARK OFFICE
CERTIFICATE OF CORRECTION

PATENT NO.         : 7,350,070 B2
APPLICATION NO. : 10/823837
DATED              : March 25, 2008
INVENTOR(S)       : Kevin L. Smathers et al.

It is certified that error appears in the above-identified patent and that said Letters Patent is hereby corrected as shown below:

In column 9, line 57, in Claim 6, delete "claim S" and insert -- claim 5 --, therefor.

In column 10, line 12, in Claim 9, delete "tile" and insert -- file --, therefor.

Signed and Sealed this

Nineteenth Day of August, 2008

JON W. DUDAS
*Director of the United States Patent and Trademark Office*